United States Patent [19]
Sato et al.

[11] Patent Number: 5,621,713
[45] Date of Patent: Apr. 15, 1997

[54] DISC PLAYER APPARATUS

[75] Inventors: Futoshi Sato, Kanagawa; Takashi Tsugami, Kanagawa; Masaki Enomoto, Saitama, all of Japan

[73] Assignee: Sony Corporation, Tokyo, Japan

[21] Appl. No.: 518,559

[22] Filed: Aug. 23, 1995

[30] Foreign Application Priority Data

Aug. 26, 1994 [JP] Japan ..................... 6-202112

[51] Int. Cl.⁶ ............................... G11B 33/02
[52] U.S. Cl. ............................... 369/75.2
[58] Field of Search ................... 369/75.1, 75.2, 369/77.1, 77.2

[56] References Cited

U.S. PATENT DOCUMENTS

| | | | |
|---|---|---|---|
| 4,661,940 | 4/1987 | Camerik | 369/111 |
| 5,210,737 | 5/1993 | Liu | 369/75.1 |
| 5,216,558 | 6/1993 | Griffith et al. | 360/99.06 |
| 5,313,351 | 5/1994 | Lee | 360/99.07 |

FOREIGN PATENT DOCUMENTS

| | | |
|---|---|---|
| 0416797A2 | 3/1991 | European Pat. Off. . |
| 0514607A1 | 11/1992 | European Pat. Off. . |
| 5-342732 | 12/1993 | Japan . |

Primary Examiner—Stuart S. Levy
Assistant Examiner—William J. Klimowicz
Attorney, Agent, or Firm—Limbach & Limbach L.L.P.

[57] ABSTRACT

A disc player apparatus for moving a tray unit between the inside and the outside of an outer casing for loading a recording disc. The disc player apparatus includes a pickup device arranged on the tray unit for reading out the recorded information from a recording disc, a first driving unit for moving the tray unit between a position of being housed within the outer casing and a position of being protruded outwardly from the outer casing, a disc table supported on the tray unit for movement in a direction towards and away from the pickup device, and a second driving unit for moving the disc table on the tray unit in a direction towards and away from the pickup device. The disc table holds and rotates the recording disc. The second driving unit shifts the disc table to a position furthest from the outer casing in a range of possible movement of the disc table relative to the tray unit if the first driving unit moves the tray unit to the position of being protruded from the outer casing. The second driving unit also shifts the disc table to a position most proximate to the outer casing in a range of possible movement of the disc table relative to the tray unit if the first driving unit shifts the tray unit to the position of being accommodated within the outer casing.

11 Claims, 14 Drawing Sheets

DISC PLAYER APPARATUS

BACKGROUND

1. Field of the Invention

This invention relates to a disc player apparatus for reproducing information signals recorded on a recording disc, such as an optical disc. More particularly, it relates to a disc player apparatus in which a disc tray movably supported across the inner and outer portions of an outer casing constituting a main body of the apparatus is moved for loading a recording disc set on the disc tray on a disc table arranged in the inner portion of the outer casing.

2. Background of the Invention

Up to now, a disc player apparatus in which information signals recorded on an optical disc as a recording disc, is in widespread use.

This type of the disc player apparatus includes a loading mechanism for loading the recording disc set on the disc tray on the disc table arranged in the outer casing by moving the disc tray movably supported across the inner and outer portions of the outer casing constituting the main body of the apparatus, and a chuck mechanism for clamping the optical disc loaded by the loading mechanism on the disc table.

The loading mechanism employed for this disc player apparatus includes a disc tray moved across the inner and outer portions of the outer casing constituting the main body of the apparatus. The optical disc is loaded on or unloaded from the disc tray in a state in which the disc tray is pulled out of the outer casing. The disc tray also transports the optical disc into the outer casing by being pulled into the outer casing with the optical disc set thereon.

On the other hand, the chuck mechanism is made up of a disc table on which the optical disc is set and which is rotated in unison with the optical disc, and a chuck plate rotatably supported for facing the disc table.

The disc table on which the optical disc is set and which is rotated in unison with the optical disc constitutes a disc drive along with the optical pickup device. Thus the disc table is mounted on a driving shaft of the spindle motor and rotated under the driving force of the spindle motor. The optical pickup device, constituting the disc drive, is supported for movement across the inner and outer rims of the optical disc set on the disc table via a movement guide member, while being moved across the inner and outer rims of the optical disc via an optical disc driving mechanism.

The disc drive is arranged within the outer casing for movement in a direction in which the disc table is moved towards and away from the chuck plate. When the optical disc is to be loaded, the disc table has been moved to a position spaced apart from the chuck plate. The optical disc drawn into the outer casing by the loading mechanism is set on the disc tray and transported in this state to a space between the disc table and the chuck table. The optical disc transferred into the inside of the outer casing is set on the disc table, by movement of the disc table towards the chuck plate. On the other hand, the optical disc is thrust and supported by the chuck plate so as to be clamped for rotation in unison with the disc table. If, with the optical disc clamped on the disc table in cooperation with the chuck plate, the spindle motor is run in rotation, the optical disc is rotated in unison with the disc table and the chuck plate. The information signals recorded on the optical disc are reproduced by movement of the optical pickup device across the inner and outer rims of the optical disc being run in rotation.

With the above-described disc player apparatus, the disc drive is moved towards the chuck plate after drawing the optical disc set on the disc tray into the inside of the outer casing by the loading mechanism for clamping the optical disc on the disc table. Thus, with the present disc player apparatus, the operation of setting the optical disc on the disc tray drawn out of the outer casing, drawing the optical disc into the inside of the outer casing for completing the loading on the disc table and starting the reproduction of the information signal recorded on the optical disc, is time-consuming, while it is extremely difficult to shorten the time required in a series of operations for loading the optical disc.

For shortening the time for loading the optical disc, it may be contemplated to arrange the disc drive carrying the optical disc on the disc tray moved across the inner and outer rims of the outer casing for moving the disc drive along with the disc tray towards outside of the outer casing. Since the present disc player apparatus is configured for moving the disc drive across the inner and outer portions of the outer casing, the optical disc may be directly loaded on the disc drive pulled out of the outer casing. Thus the information signals recorded on the optical disc may be immediately reproduced after the disc drive carrying the loaded optical disc is pulled into the inside of the outer casing, so that it becomes possible to reduce the loading time for quickly reproducing the information signals.

However, if the disc drive is placed on the disc tray moved across the inner and outer rims of the outer casing, it becomes necessary to pull out the disc drive inclusive of the disc table in its entirety out of the outer casing, thus increasing the distance traversed by the disc tray. In addition, the movement mechanism for movably supporting the heavy disc drive needs to be increased in mechanical strength in order to pull out the disc drive out of the outer casing, thus increasing the size of the movement mechanism. The result is that the disc player itself is increased in size and weight.

OBJECTS AND SUMMARY OF THE INVENTION

It is therefore an object of the present invention to provide a novel disc player apparatus in which the disc table for rotating the recording disc and the pickup device for reading out information signals recorded on the recording disc are moved across the inner and outer portions of the outer casing for loading the recording disc.

It is another object of the present invention to provide a disc player apparatus in which the disc table and an optical pickup are moved across the inner and outer rims of the outer casing for loading the recording disc, in which the recording disc on the disc table may be loaded and unloaded easily.

It is a further object of the present invention to provide a disc player apparatus in which it is possible to reduce the size and weight of the player apparatus itself.

According to the present invention, there is provided a disc player apparatus having a tray unit supported for movement between a position of being housed within an outer casing and a position protruded outwardly from the outer casing, a pickup device arranged on the tray unit for reading out the recorded information from a recording disc, first driving means for moving the tray unit between a position of being housed within an outer casing and a position of being protruded outwardly from the outer casing, a disc table supported on the tray unit for movement in a direction towards and away from the pickup device, and second driving means for moving the disc table on the tray unit in a direction towards and away from the pickup device. The disc table holds and rotates the recording disc. The second driving means moves the disc table to a position furthest from the outer casing in a range of possible movement of the disc table relative to the tray unit if the first driving means moves the tray unit to the position protruded from the outer casing.

When the first driving mechanism shifts the tray unit in a direction in which the tray unit is housed within the outer casing, the second driving mechanism shifts the disc table to a position most proximate to the pickup device within a range of possible disc table movement relative to the tray unit.

The tray unit of the disc player apparatus according to the present invention is movable a distance corresponding to the length of the tray unit by-a shaft mounted on the tray unit being movably supported by a thrust bearing arranged within the outer casing. The shaft has a length substantially twice the length of the tray unit and has its one end positioned in the vicinity of the outwardly directed forward end of the outer casing of the tray unit, while having its other end protruded to the rear side of the tray unit so as to be mounted on the tray unit. The thrust bearing supports the shaft at a position in the vicinity of the forward end of the tray unit and at a position in the vicinity of the rear end of the tray unit when the tray unit is housed within the outer casing.

The disc table of the disc player apparatus of the present invention is supported by a spindle shaft rotatably supported by a supporting block arranged on the tray unit so as to be moved towards and away from the pickup device.

The disc player apparatus according to the present invention has control means for controlling the first and second driving means. The control means operates so that, when the tray unit is to be moved by the first driving means to a position protruded out of the outer casing, the disc table is moved by the second driving means to a position furthest from the optical pickup device in a range of possible movement of the disc table relative to the tray unit. The control means also operates for detecting the time of movement of the disc table relative to the tray unit during movement of the disc table, and for reversing the direction of movement of the disc table in case the time exceeding a pre-set time has elapsed.

The disc player apparatus according to the present invention also has a disc clamping member which can be detached when the tray unit is protruded out of the outer casing and which holds the recording disc in cooperation with the disc table.

With the disc player apparatus according to the present invention, when the first driving mechanism shifts the tray unit to a position protruded out of the outer casing, the second driving mechanism shifts the disc table to a position furthest from the outer casing in the range of possible movement of the disc table relative to the tray unit, so that the recording disc may be easily mounted on and dismounted from the disc table while minimizing the amount of protrusion of the tray unit out of the outer casing.

With the disc player apparatus according to the present invention, when the first driving mechanism shifts the tray unit to a position accommodated within the outer casing, the second driving mechanism shifts the disc table to a position most proximate to the outer casing in the range of possible movement of the disc table relative to the tray unit, so that information signals can be read from the recording disc as soon as the tray unit is drawn into the inside of the outer casing thus enabling a prompt reproducing operation.

DESCRIPTION OF THE PREFERRED EMBODIMENTS

Figure 1:
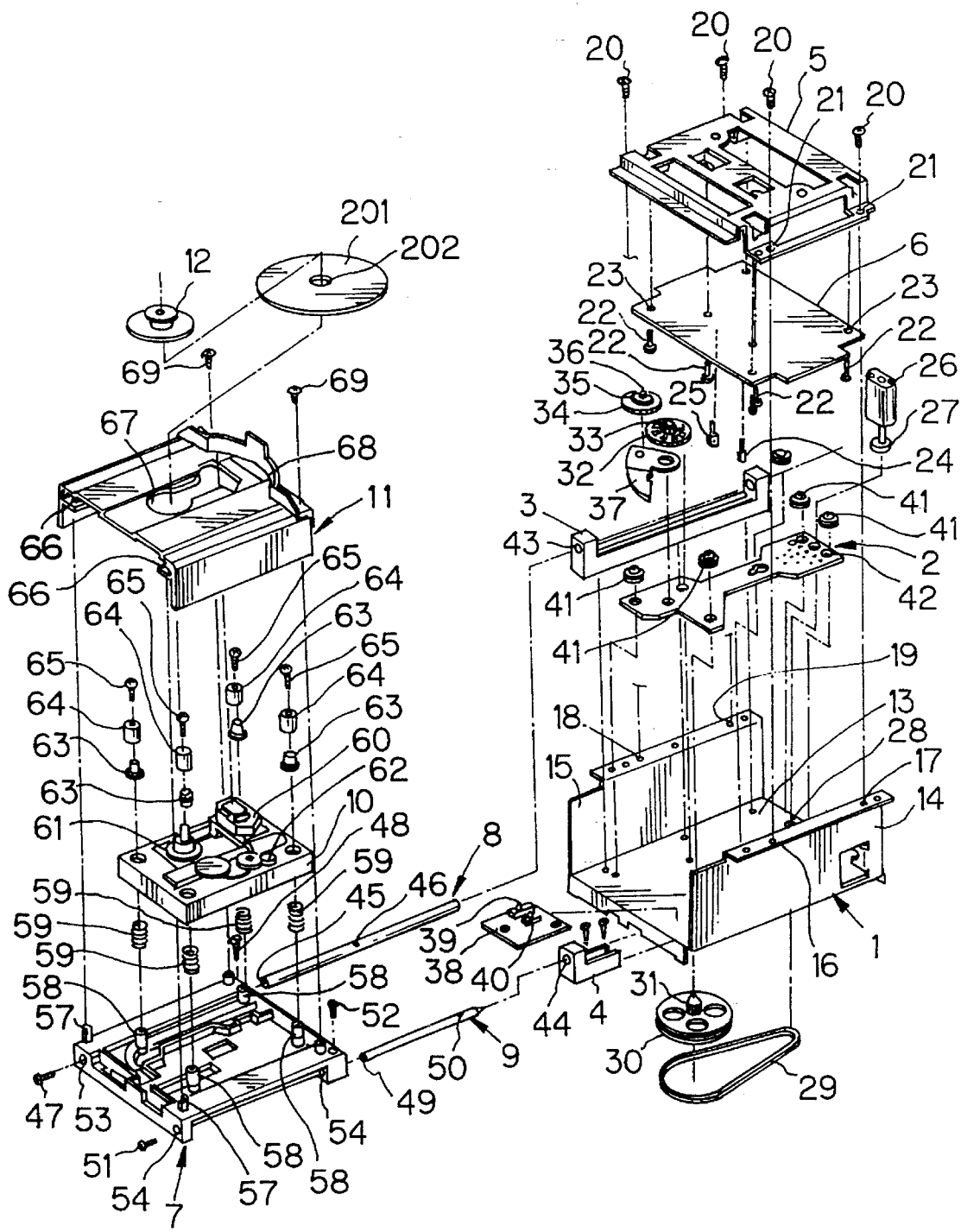
FIG. 1 is an exploded perspective view showing a mechanical portion of a disc player apparatus according to the present invention.

In the drawings, there is shown an embodiment of the present invention in which the invention is applied to a disc player apparatus employing a replay-only optical disc having a diameter of 12 cm or 8 cm, as an optical disc having information signals recorded thereon.

An optical disc 201, employed for a disc player apparatus according to the present invention, is comprised of a disc substrate 201 formed of a transparent synthetic resin, such as polycarbonate, and having a center opening 202. The disc substrate 201 has a signal recording surface on which information signals are recorded in the form of micro-sized pits. The surface having the micro-sized pits is coated with a reflective film formed of a metal material, such as aluminum, which in turn is coated with a protective film of a synthetic resin.

The information signals recorded by these pits on the optical disc 201 are read out by radiating an optical beam from an optical pickup device to the signal recording surface of the optical disc 201 and by detecting the return light from the signal recording surface by a photodetector provided in the optical pickup device.

Referring to FIG. 1, the disc player apparatus according to the present invention includes a chassis frame 1. This chassis frame 1 is formed by punching and bending a metal plate and is comprised of a bottom plate 13 and left and right side plates 15, 14 formed on both sides of the bottom plate 13.

Figure 2:
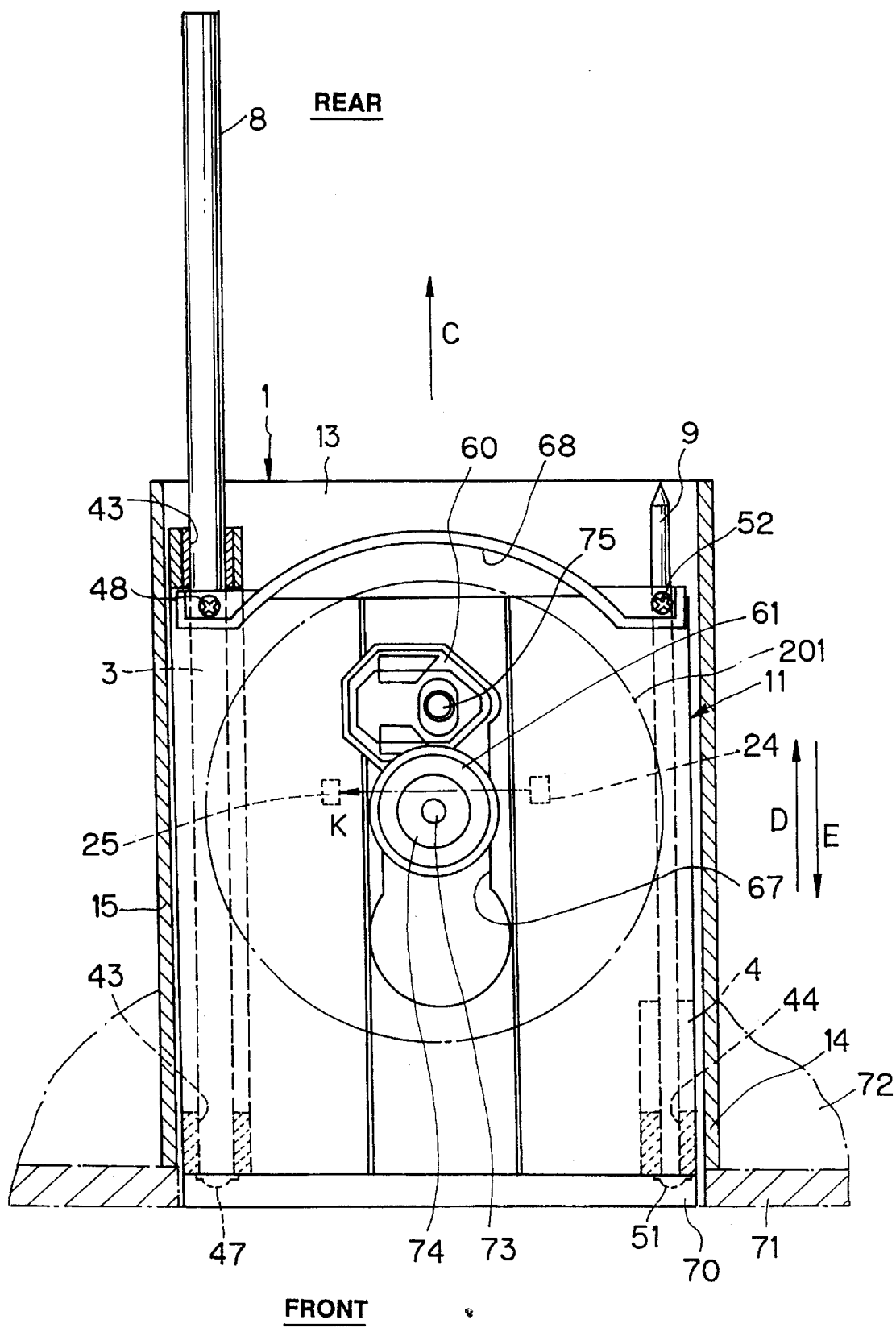
FIG. 2 is a plan view showing a tray portion of the disc player apparatus according to the present invention.

Referring to FIG. 2, the chassis frame 1 is secured to a bottom plate 72 of an outer casing of the disc player apparatus.

A top plate 5 is mounted across upper ends of the side plates 15, 14. The top plate 5 is a substantially flat plate and is mounted on the chassis frame 1 by plural screws 20 engaged in tapped holes 16, 17, 18 and 19 formed in the upper ends of the side plates 15, 14. The screws 20 are passed through plural screw holes 21 formed on both lateral sides of the top plate 5.

A circuit substrate 6 is mounted on the lower side of the top plate 5. The circuit substrate 6 has plural screw holes 23 through which are passed plural screws 22 engaged in tapped holes formed in the top plate 5 for mounting the circuit substrate to the top plate.

On the bottom plate 13 of the chassis frame 1, that is between the side plates 15 and 14 below the circuit substrate 6, there is formed a tray unit 7 constituting the loading mechanism. On the tray unit 7 is mounted a disc drive 10 as later explained. On the upper surface of the tray unit 7 is mounted a tray cover 11 overlying the disc drive 10. On the front edge of the tray unit 7 and the tray cover 11 is mounted a display panel 70 constituting a display unit.

The tray cover 11 is mounted on the tray unit 7 by having left and right engagement pawls 57, 57 provided on the front side of the upper surface of the tray unit 7 engaged in left and right engagement holes 66, 66 on the front side and by securing its rear side secured to the tray unit 7 by left and right set screws 69, 69.

Figure 3:
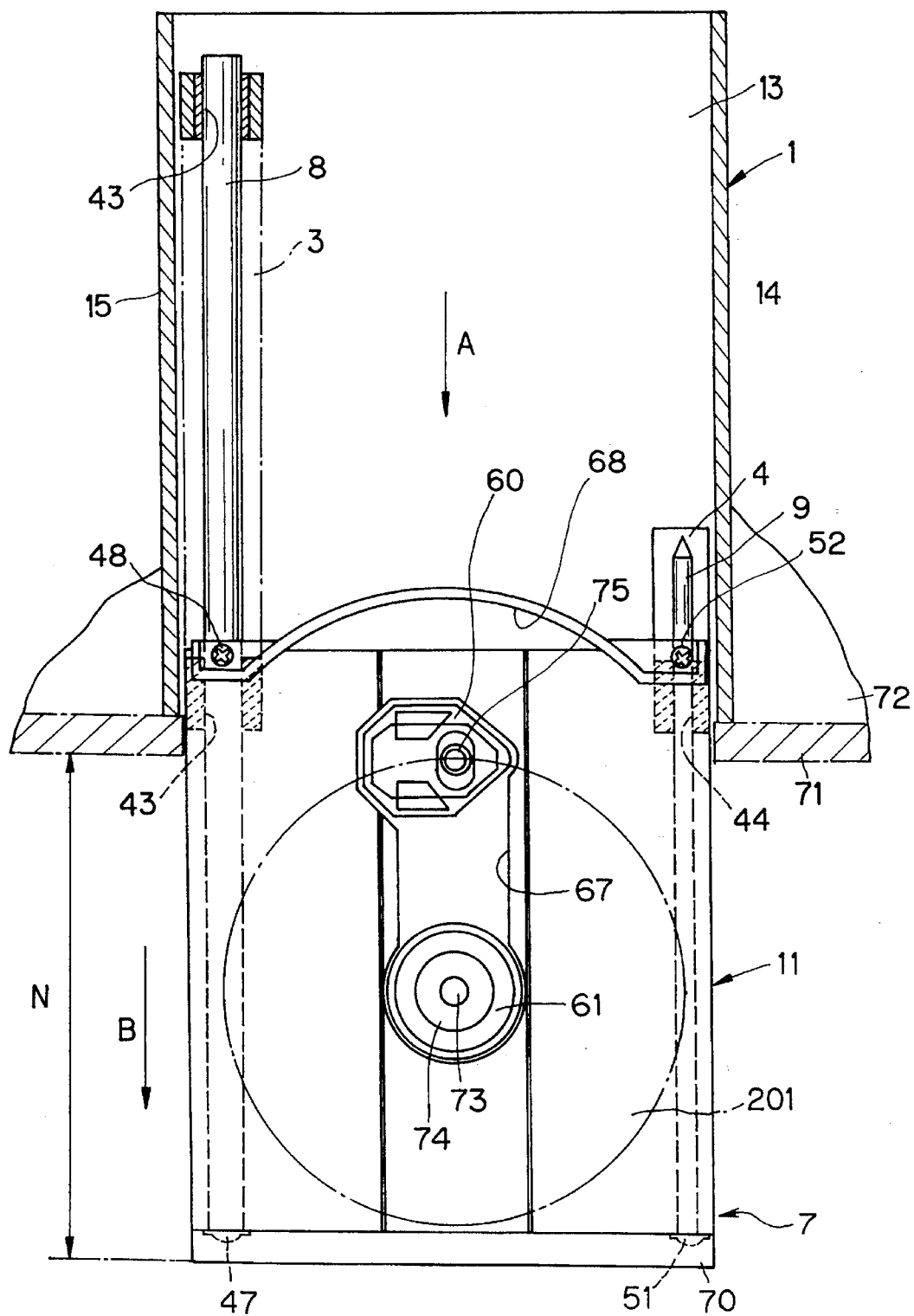
FIG. 3 is a plan view showing the state in which the tray portion has been moved to outside of an outer casing.

The tray unit 7 is supported for movement between a loading position in which the display panel 70 is housed within the outer casing along a front panel 71 of the outer casing as shown in FIG. 2 and an ejecting position in which the display panel is protruded out of the outer casing towards outside as indicated by arrow A in FIG. 3.

That is, the tray unit 7 is movable in the fore-and-aft direction a distance substantially corresponding to the fore-and-aft distance of the tray unit 7 by first and second shafts 8, 9 mounted on the tray unit 7 in the fore-and-aft direction being movably supported on first and second thrust bearings 3, 4 arranged on the bottom plate 13 of the chassis frame 1.

The first shaft 8 has a length substantially twice the fore-and-left length of the tray unit 7. The first shaft 8 is mounted on the tray unit 7 for extending along a lateral side of the tray unit 7 by having its front end positioned in the vicinity of the forward edge of the tray unit 7 and by having its other end, that is its rear end, protruded towards the rear side of the tray unit 7.

The front end of the first shaft 8 is formed with a forward side tapped hole 45 engaged by a set screw 47 inserted through a through-hole 53 formed in the front end face of the tray unit 7. A side tapped hole 46 is formed at a mid portion of the first shaft 8. This side tapped hole 46 is engaged by a set screw 48 introduced in a through-hole, not shown, formed in the rear lateral edge of the tray unit 7.

The second shaft 9 is of a length substantially equal to the fore-and-aft length of the tray unit 7. The second shaft 9 is mounted on the tray unit 7 by having its front end positioned in the vicinity of the forward edge of the tray unit 7 and by having its rear end positioned in the vicinity of the rear edge of the tray unit 7.

The front end of the second shaft 9 has a front-end tapped hole 49 engaged by a set screw 51 introduced in a through-hole 54 formed in the front end face of the tray unit 7. The rear end side of the second shaft 9 is formed with a side tapped hole 50 engaged by a set screw 52 passed through a through-hole 56 formed in the rear edge of the tray unit 7.

The first thrust bearing 3 has bearing holes 43, 43 in the front and rear end sides thereof. The first shaft 8 is passed through and supported by these bearing holes.

When the tray unit 7 is in the loading position, the first thrust bearing 3 supports the first shaft 8 at a position thereof near the front edge of the tray unit 7 and at a position thereof near the rear edge of the tray unit 7. When the tray unit 7 is in the ejecting position, the first thrust bearing 3 supports the portion of the first shaft 8 near the rear edge of the tray unit 7 and the portion of the first shaft near the rear end of the tray unit 7.

The second thrust bearing 4 has a bearing hole 44 in the front end which is passed through by and supports the second shaft 9.

When the tray unit 7 is in the loading position, the second thrust bearing 4 supports the portion of the second shaft 9 in the vicinity of the front end of the tray unit 7. When the tray unit 7 is in the ejecting position, the second thrust bearing 4 supports the portion of the second shaft 9 in the vicinity of the rear edge of the tray unit 7.

The upper surface of the tray cover 11 is formed with a through-hole 67 for exposing an optical pickup device 60 and a disc table 61 of the disc drive 10 as later described. The rear side of the upper surface of the tray cover 11 is formed with a protruded bowed wall section 68 for prohibiting descent of the optical disc towards rear.

Figure 9:
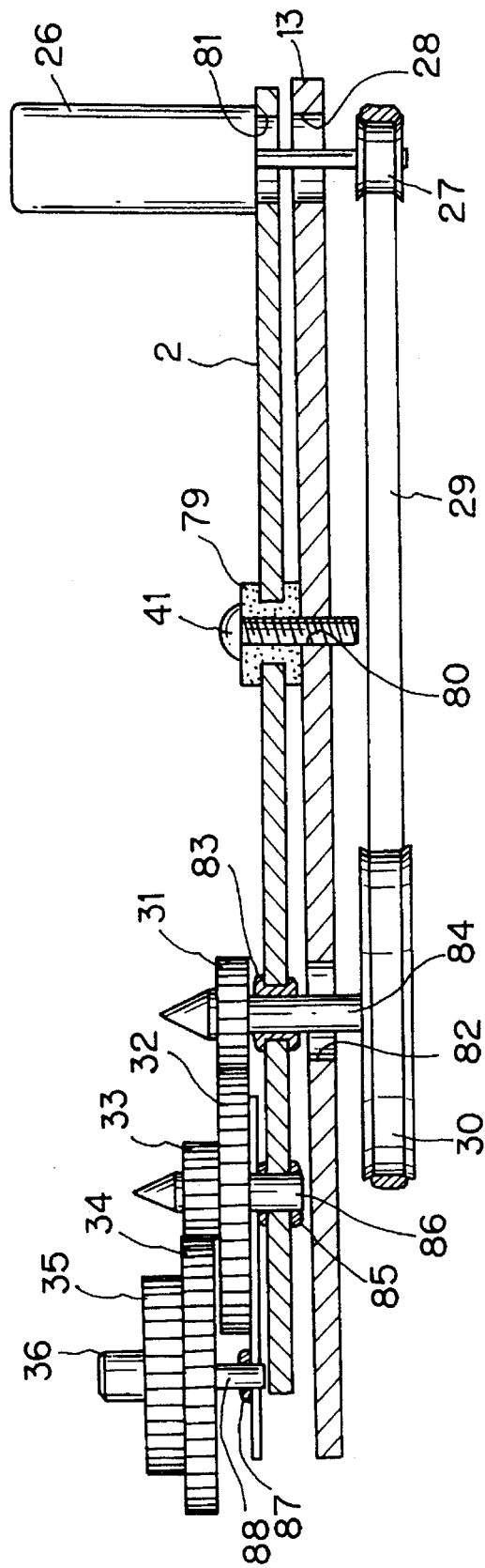
FIG. 9 is a longitudinal cross-sectional view showing an arrangement for supporting a loading motor and a speed-reducing gear of the loading mechanism.

The tray unit 7 is moved by a first driving mechanism. The first driving mechanism is made up of a loading motor 26 as a driving motor for generating a driving force for driving the loading mechanism and an endless driving belt 29 and plural transmission gears 31 to 35 as driving power transmission for transmitting the driving power generated by the loading motor 26, as shown in FIG. 9. The loading motor 26 is run in rotation by a control circuit constituting control means controlling the operation of the disc player apparatus.

The loading motor 26 and the transmission gears 31 to 35 are mounted on a supporting plate 2 mounted via a plurality of dampers 79 operating as a buffer member for the chassis frame 1, without being contacted with the chassis frame 1. That is, the supporting plate 2 is positioned on the bottom plate 13 of the chassis frame 1, and is mounted by plural set screws 41 on the bottom plate 13. These set screws 41 are passed through plural through-holes 42 formed in the supporting plate 2 so as to be engaged in tapped holes 42 formed in the supporting plate 2 and are subsequently engaged in tapped holes 80 formed in the bottom plate 13 of the chassis frame 1. The dampers 79 are interposed between the peripheral surface of each set screw 41 and the inner peripheral edge of each through-hole 42 of the supporting plate 2. These dampers 79 are substantially cylindrically-shaped and formed of a material having high shock-absorbing properties, such as butyl rubber. These dampers 79 are fitted on the outer side of each set screw 41 and fitted in the through-holes 42 in the supporting plate 2 so as to be supported on the outer periphery thereof by the inner peripheral edge of the through-holes 42.

The loading motor 26 is mounted on an upper surface of the supporting plate 2 with its driving shaft directed downwards. The driving shaft of the loading motor 26 is passed through a through-hole 81 formed in the supporting plate 2 and through a through-hole 28 formed in the bottom plate 13 so as to be protruded to below the bottom plate 13. The lower end of the driving shaft carries a driving pulley 27. An endless belt 29 is placed around the driving pulley 27 and a driven pulley 30. The driven pulley 30 is mounted for rotation in idle below the bottom plate 13. That is, the driven pulley 30 is mounted on the lower end of a supporting shaft 84 rotatably supported on the supporting plate 2 via a bearing 83. The first supporting shaft 84 has its lower end protruded below the bottom plate 13 via a through-hole 82 formed in the bottom plate 13.

A first transmission gear 31 is mounted on the upper end of the first supporting shaft 84. The first transmission gear 31 meshes with a second transmission gear 32 larger in diameter than the first transmission gear 31. This second transmission gear 32 is mounted for rotation above the supporting plate 2. The second transmission gear 32 is mounted at a mid portion of a second supporting shaft 86 rotatably supported via a bearing 85. A third transmission gear 33 smaller in diameter than the second transmission gear 32 is mounted on the upper end of the second supporting shaft 86.

The third transmission gear 33 meshes with a fourth transmission gear 34 larger in diameter than the third transmission gear 33. The fourth transmission gear 34 is positioned above the supporting plate 2 and adapted for being rotated and moved around the second supporting shaft 86.

That is, the fourth transmission gear 34 is mounted on a rotary plate 37 supported for rotation around the second supporting shaft 86. The rotary plate 37 has its proximal end supported for rotation around the second supporting shaft 86 and carries on its distal end a third supporting shaft 88 for rotation via a bearing 87. The fourth transmission gear 34 is mounted at a mid portion of a third supporting shaft 88. The fourth transmission gear 34 may be rotated around the third transmission gear 33 while remaining engaged with the third transmission gear 33. The upper end of the third supporting shaft 88 carries a pinion gear 35 which is a transmission gear smaller in diameter than the fourth transmission gear 34. The upper end of the third supporting shaft 88 protruded above the pinon gear 35 functions as a lock pin 36.

Figure 4:
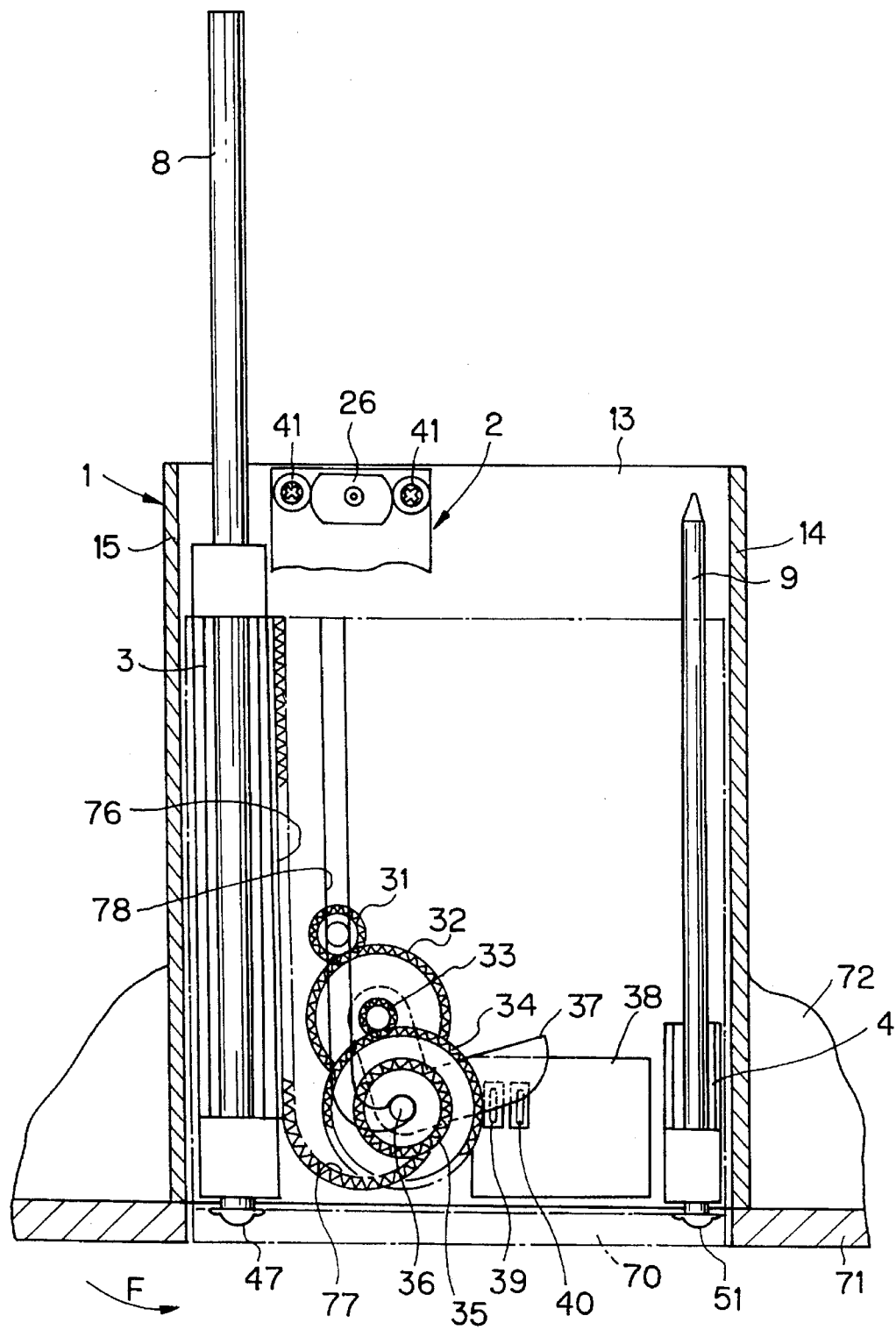
FIG. 4 is a plan view showing a loading mechanism for moving the tray portion.
Figure 5:
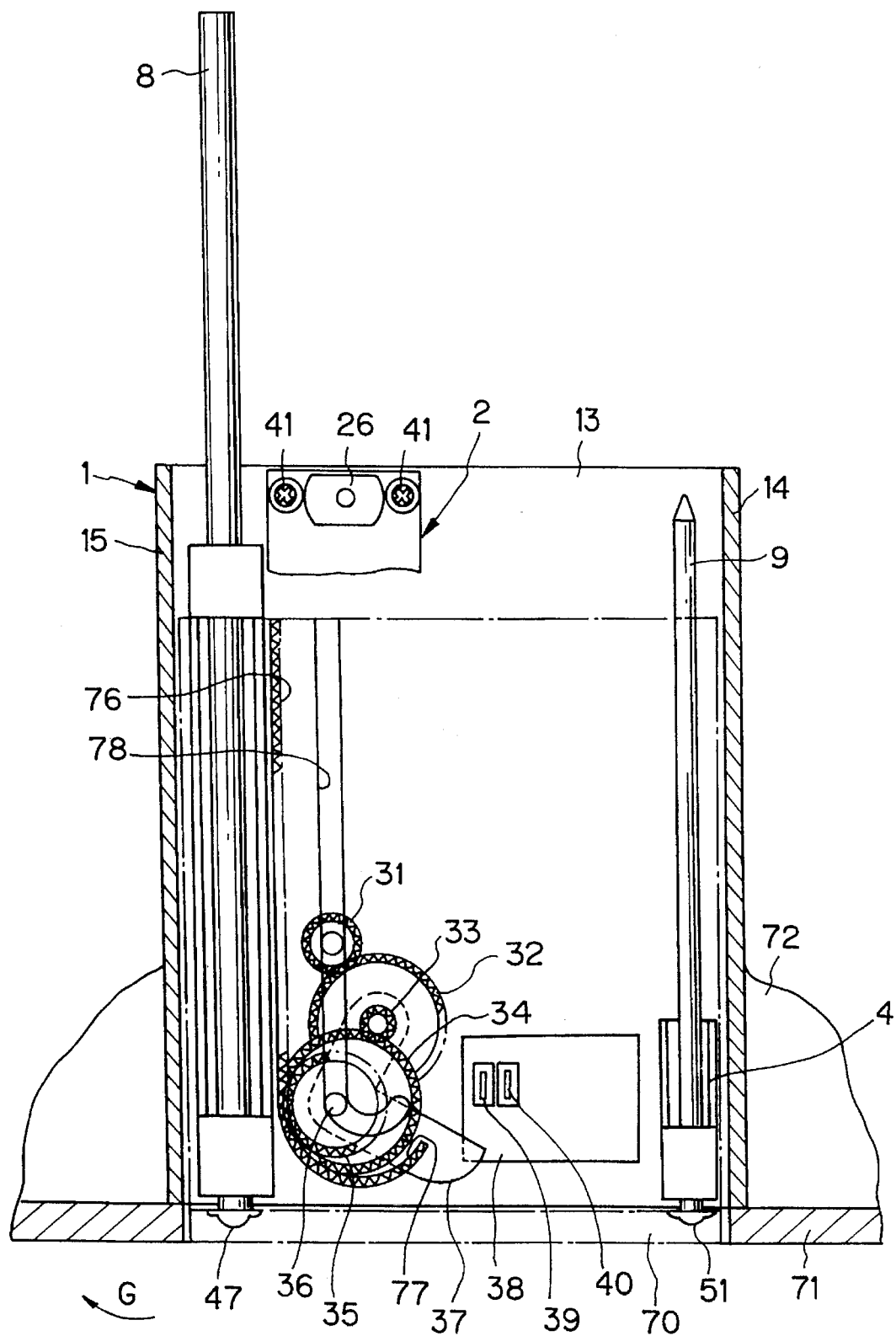
FIG. 5 is a plan view showing the state in which the tray portion is being moved by the loading mechanism.
Figure 6:
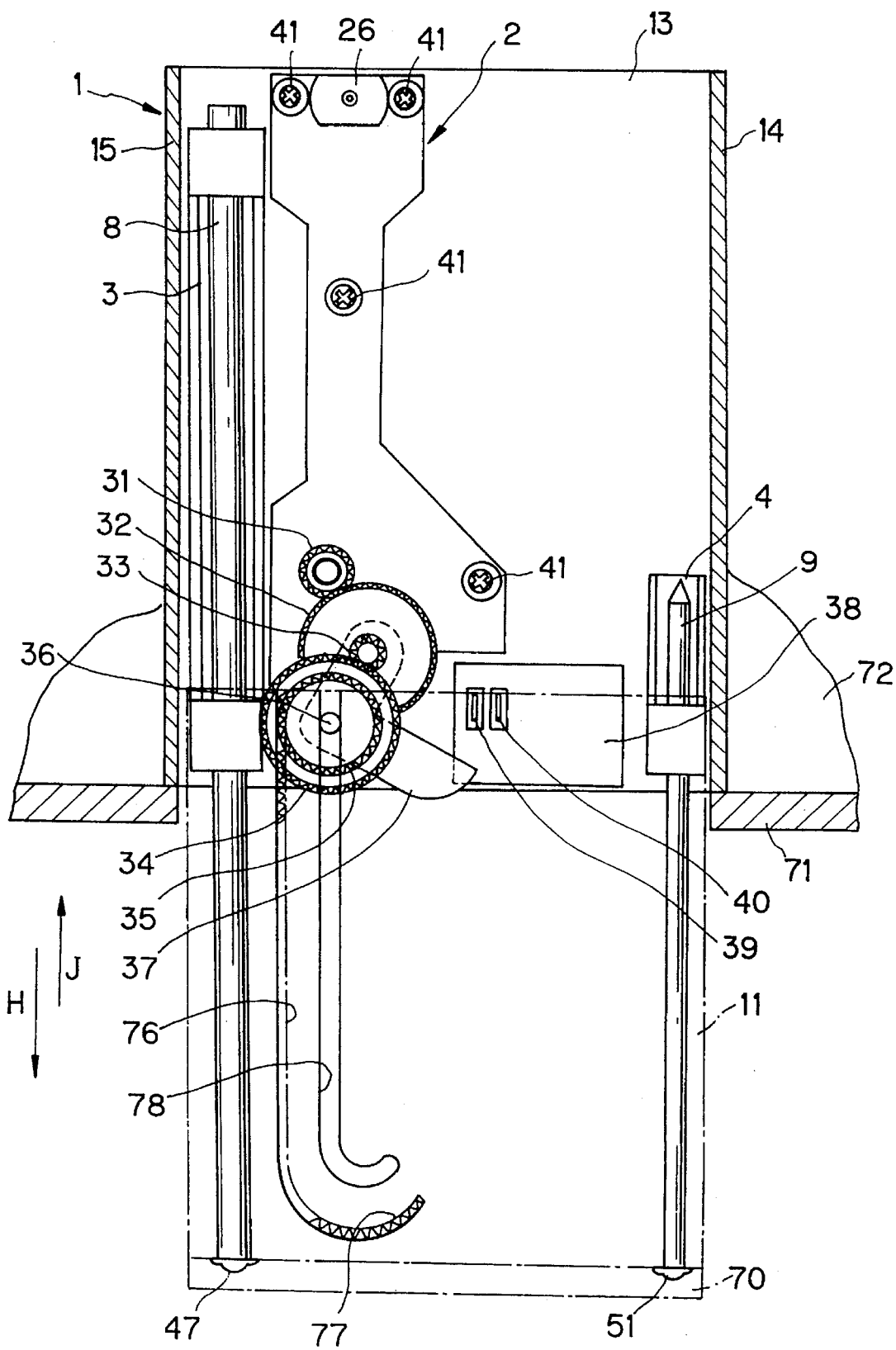
FIG. 6 is a plan view showing the state in which the tray portion has been moved to outside the outer casing by the loading mechanism.

The lower surface of the tray unit 7 is formed with a rack gear 76 meshing with the pinion gear 35 and with a guide slit 78 engaged by the lock pin 36, as shown in FIGS. 4 to 6. The rack gear 76 is formed for extending in the fore-and-aft direction along a lateral edge of the tray unit 7. The foremost part of the rack gear 76 is a arcuately bowed portion 77 in the direction of teeth of the rack gear 76. The foremost part of the guide slit 78 is arcuately bowed in the form of an arc having the center of curvature of the bowed portion 77 as the center of arc.

When the tray unit 7 has been moved to the loading position, the pinion gear 35 meshes with the distal end of the bowed portion 77 of the rack gear 76, as shown in FIG. 4. The lock pin 36 is engaged at this time with the forward bowed portion of the guide slit 78 in order to prohibit the tray unit 7 from advancing forward under an external pressure. When the tray unit 7 is in the loading position, the center of curvature of the bowed portion 77 is coincident with the axis of the supporting shaft 86 supporting the third transmission gear 33. At this time, the distal end of the rotary plate 37 thrusts a pair of detection switches arranged on the bottom plate 13 of the chassis frame 1. These detection switches 39, 40 are switches for detecting that the tray unit 7 is at the loading position, and are connected to a control circuit, not shown.

When the loading motor 26 is actuated for rotation in one direction, the pinion gear 35 is rotated by respective transmission gears. The pinion gear 35 is then moved along the bowed portion 77 along an arrow G in FIG. 5, while remaining engaged with the bowed portion 77. That is, the rotary plate 37 is turned, while the lock pin 36 is moved along the forward bowed portion of the guide slit 78. The detection switches 39, 40 are released from the state of being pressed by the rotary plate 37. When the pinion gear 35 reaches a linear portion extending in the fore-and-aft direction of the rack gear 76, and is rotated further, the pinion gear 35 shifts the tray unit 7 forwardly as indicated by arrow H in FIG. 6. The lock pin 36 is engaged at this time with the linear portion of the guide slit extending in the fore-and-aft direction for inhibiting rotation of the rotary plate 37. The tray unit 7 has been moved to the ejecting position. When the tray unit 7 has been moved to the ejecting position, a detection switch, not shown, is pressed. When the detection switch is pressed, the control circuit halts the operation of the loading motor 26.

The tray unit 7, thus set to the ejecting position, protrudes the first shaft 8 towards rear. The tray unit is supported stably since the rear end portion of the first shaft 8 is supported by the thrust bearing 3. If, while the tray unit 7 is at the ejecting position, the loading motor 26 is run in rotation in the opposite direction, the pinion gear 35 is run in rotation, with the tray unit 7 being moved towards rear as indicated by arrow J in FIG. 6. When the foremost part of the linear portion of the rack gear 76 reaches a position of meshing with the pinion gear 35, as shown in FIG. 5, the display panel 70 substantially reaches a position along the front panel 71. The speed of movement of the tray unit 7 is decreased by the pinion gear 35 being moved to the state of meshing with the bowed portion 77. If the rotary plate 37 is turned with the pinion gear 35 meshing with the bowed portion 77, the tray unit 7 has been moved to the loading position. If the pinion gear 35 meshes with the bowed portion 77 for rotating the rotary plate 37, the tray unit 7 has been moved to its loading position. If the pinion gear 35 is rotated further and the rotary plate 37 is rotated towards the distal end of the bowed portion 77 as indicated by arrow F in FIG. 4, the distal end of the rotary plate 37 thrusts the detection switches 39, 40. When the detection switches 39, 40 are thrust, the control circuit halts the operation of the loading motor 26.

The disc drive 10 having the optical pickup device 60 is mounted on the tray unit 7. The disc drive 10 has a frame 113, as shown in FIGS. 11 to 15. This frame 113 is molded of a synthetic resin material in the form of a rectangular box and has four supporting holes 132 at respective corners. These supporting holes 132 are engaged by dampers 63 formed in a cylindrical shape from a material exhibiting excellent shock absorbing properties, such as butyl rubber. These dampers 63 are mounted on the tray unit 7 by support tubes 64 fitted on the upper ends thereof and by set screws 65 passed through the support tube 64 being engaged in four screw bosses 58 provided on the upper surface of the tray unit 7. A suspension spring 59 is interposed between each damper 63 and the tray unit 7. That is, the frame 113 of the disc drive 10 is supported in a floating manner over the tray unit 7 by the four dampers 63 and the four suspension springs 59.

Figure 14:
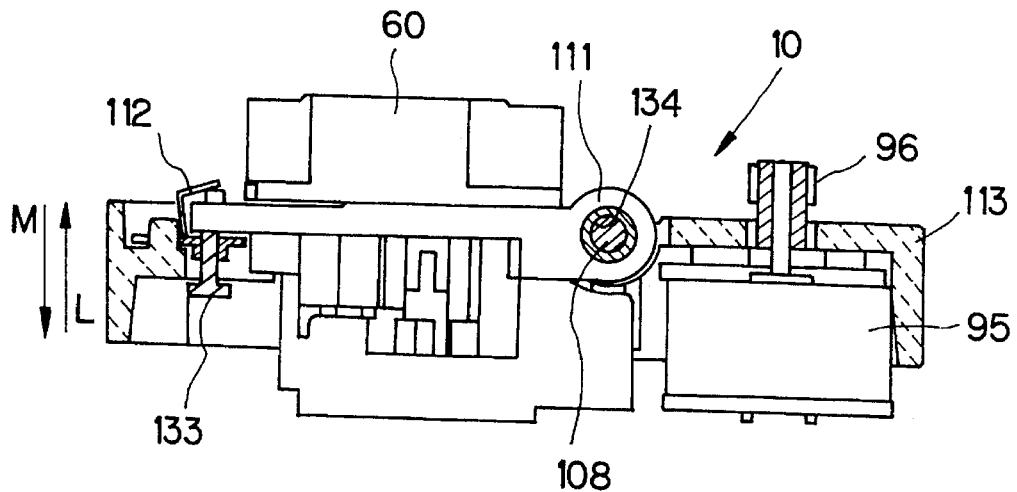
FIG. 14 is a front view showing a disc drive.

The optical pickup 60, provided at a rear portion of the frame 113, has a laser diode, as a light source, a plurality of optical devices for conducting a light beam radiated from the laser diode towards an objective lens 75, light-receiving elements, as photodetectors, and the objective lens 75 for collecting the light beam for radiating the light beam to an optical disc. These optical components are enclosed in an optical block. The optical pickup device 60 reads out information signals recorded on the optical disc 201 by radiating the light beam via the objective lens 78 to the signal recording area of the optical disc 201 and by detecting the return light reflected back from the optical disc 201 by the photodetectors. The optical pickup device 60 is arranged within an aperture 107 formed in the frame 113. This optical block of the optical pickup device 60 is provided with a bearing hole 134 at one end, as shown in FIG. 14. This bearing hole 134 accommodates a shaft 108 provided within the aperture 107. This shaft 108 is arranged for extending in the fore-and-aft direction of the frame 113 by having its both ends secured by set screws 109, 110 at the edge portions of the aperture 107. The other end of the optical block is supported by being clamped between a thrust spring 112 and an adjustment screw 133 provided on a frame 133, as shown in FIG. 14. The adjustment screw 133 and the thrusting spring 112 are mounted on an edge of the aperture 107. The optical block is turned about the axis of the shaft 108, as indicated by arrows L and M, by vertically reciprocating the adjustment screw 133 relative to the frame 113, for adjusting its tilt relative to the frame 113. The thrusting spring 112 thrusts and supports the optical block relative to the adjustment screw 133.

The optical pickup device 60 is secured in the axial direction of the shaft 108 and secured to the tray unit 7.

The disc drive 10 includes a disc table 61. The disc table, which holds and rotates the optical disc 201, is disposed ahead of the optical pickup device 60 and supports the optical disc for movement in a direction towards and away from the optical pickup device.

Figure 13:
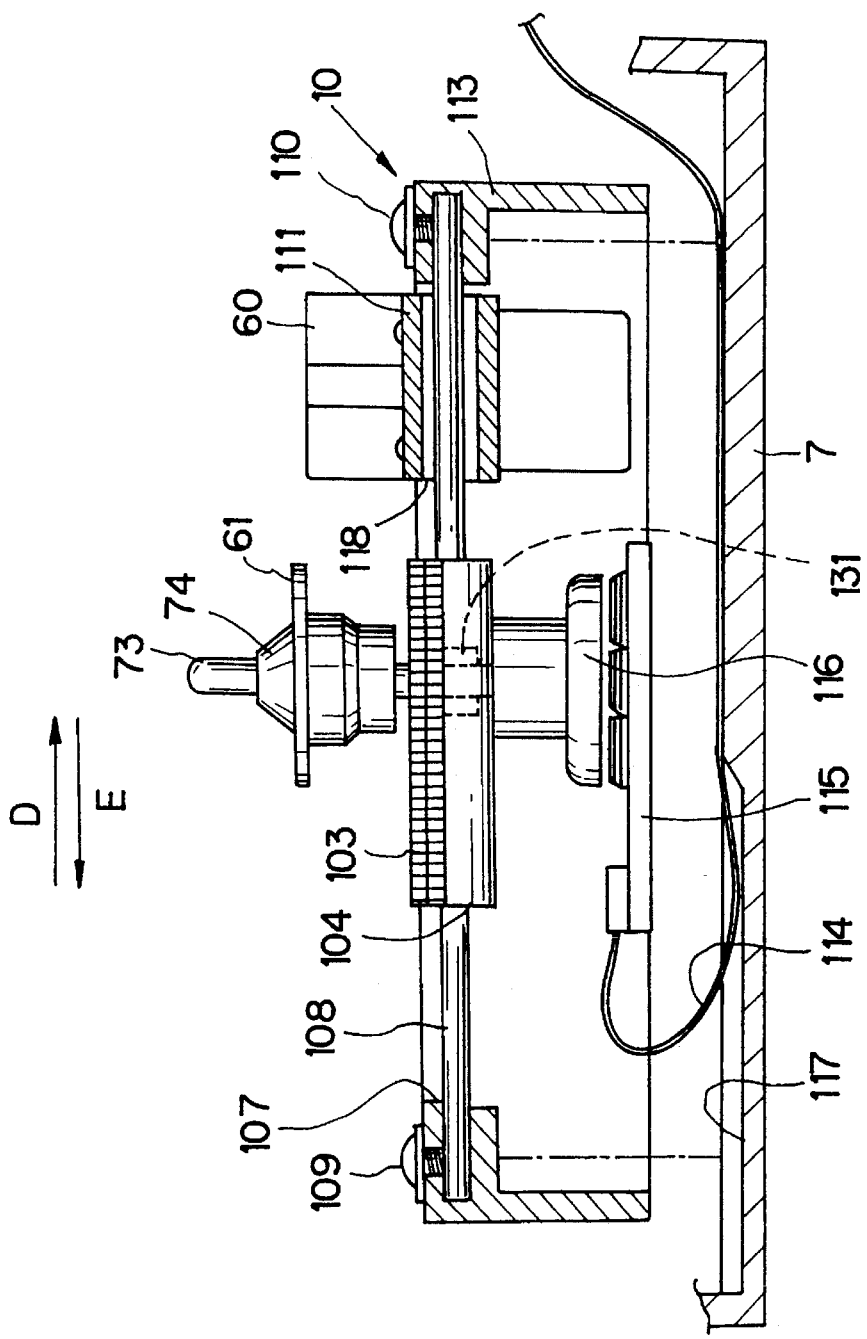
FIG. 13 is a side view showing a disc drive.
Figure 15:
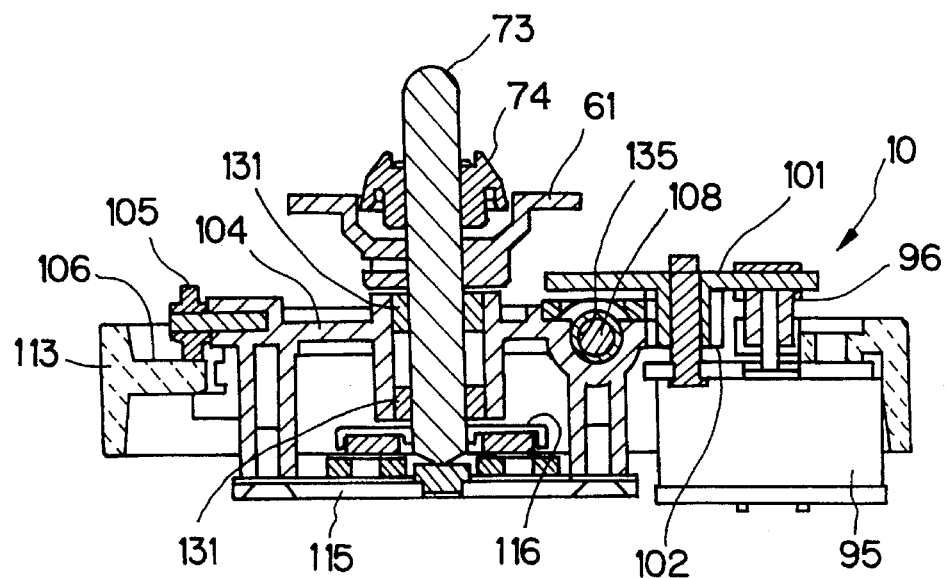
FIG. 15 is a longitudinal cross-sectional view showing a disc drive.

The disc table 61 is substantially disc-shaped and carries a substantially frusto-conically-shaped centering member 74 at a mid portion of the upper surface thereof, as shown in FIGS. 13 and 15. A spindle shaft 73 is passed through the center of the disc table 61. The centering member 74 is movable into and out of the disc table 61 along the spindle shaft 73 and is resiliently biased upwards by a biasing member, not shown. When the mid portion of the optical disc 201 is set on the disc table 61, this centering member 74 is engaged in a center opening 202 for centering the optical disc 201 relative to the disc table 61.

The spindle shaft 73 is rotatably supported by a supporting block 104 arranged within the aperture 107. The supporting block 104 is unitarily formed of an electrically conductive synthetic material or an electrically conductive metal material, and carries a metal bearing 131 supporting the spindle shaft 73 by insert molding or press-fitting. Thus the disc table 61 is electrically connected with the supporting block 104 and may be maintained at a ground potential by grounding the supporting block 104 for suppressing generation of static electricity.

The supporting block 104 has a bearing 111 at its one end supported by the shaft 108 and is movable along the shaft 108 in a direction towards and away from the optical pickup device 60 along the shaft 108 as indicated by arrows D and E in FIG. 13. The bearing 111 has a bearing hole passed through by the shaft 108. Within the bearing hole 134 is mounted a thrust bearing 135. A supporting roll 105 is rotatably mounted on the opposite side of the supporting block 104. The supporting roll 105 is set on a supporting lug 108 formed at an edger of the aperture 107. The supporting roll 105 is kept in rolling contact with the supporting lug 106 for movably supporting the supporting block 104.

The lower end of the spindle shaft 73 carries a rotor 116 consisting in a multi-poled magnet constituting a spindle motor. The spindle motor is constituted by a rotor 116 and a planar coil arranged on a circuit substrate 115 mounted on the lowered end of the supporting block 104. The rotor 116 is rotated by supplying the pre-set current to the planar coil. A driving current is supplied via a flexible substrate 114 to the circuit substrate 115 carrying the planar coil constituting the spindle motor. The flexible substrate 114 is drawn out of the disc drive 10. The upper surface of the flexible substrate 114 is formed with a channel 117 for holding the flexible substrate 114 at a pre-set position and for prohibiting the flexible substrate 114 from being bowed at an acute angle.

The supporting block 104, supporting the disc table 61, is moved by a second driving mechanism comprised of a feed motor 95 mounted on the frame 113 and a plurality of transmission gears for transmitting the driving power of the feed motor 95 to a supporting block 104. The feed motor 95 is run in rotation under control by a control circuit. That is, a driving shaft of the feed motor 95 carries a driving gear 96 meshing with a first transmission gear 97 larger in diameter than a driving gear 96 rotatably mounted on the frame 113. A second transmission gear 98 smaller in diameter than the first transmission gear 97 is mounted coaxially on the first transmission gear 97. The second transmission gear 98 meshes with a third transmission gear 99 which is larger in diameter than the second transmission gear 98 and which is rotatably mounted on the frame 113. A fourth transmission gear 100 smaller in diameter than the third transmission gear 99 is coaxially mounted on the third transmission gear 99. This fourth transmission gear 100 meshes with a fifth transmission gear 101 which is larger in diameter than the fourth transmission gear 100 and which is rotatably mounted on the frame 113. A pinion gear 102, which is a transmission gear smaller in diameter than the fifth transmission gear 101, is coaxially mounted on the fifth transmission gear 100.

The pinion gear 102 meshes with a rack gar 103 formed on one lateral side of the supporting block 104. This rack gear 103 is formed parallel to the shaft 108. Thus, when the feed motor 95 is run in rotation, the supporting block 104 is moved along the shaft 108.

Figure 16:
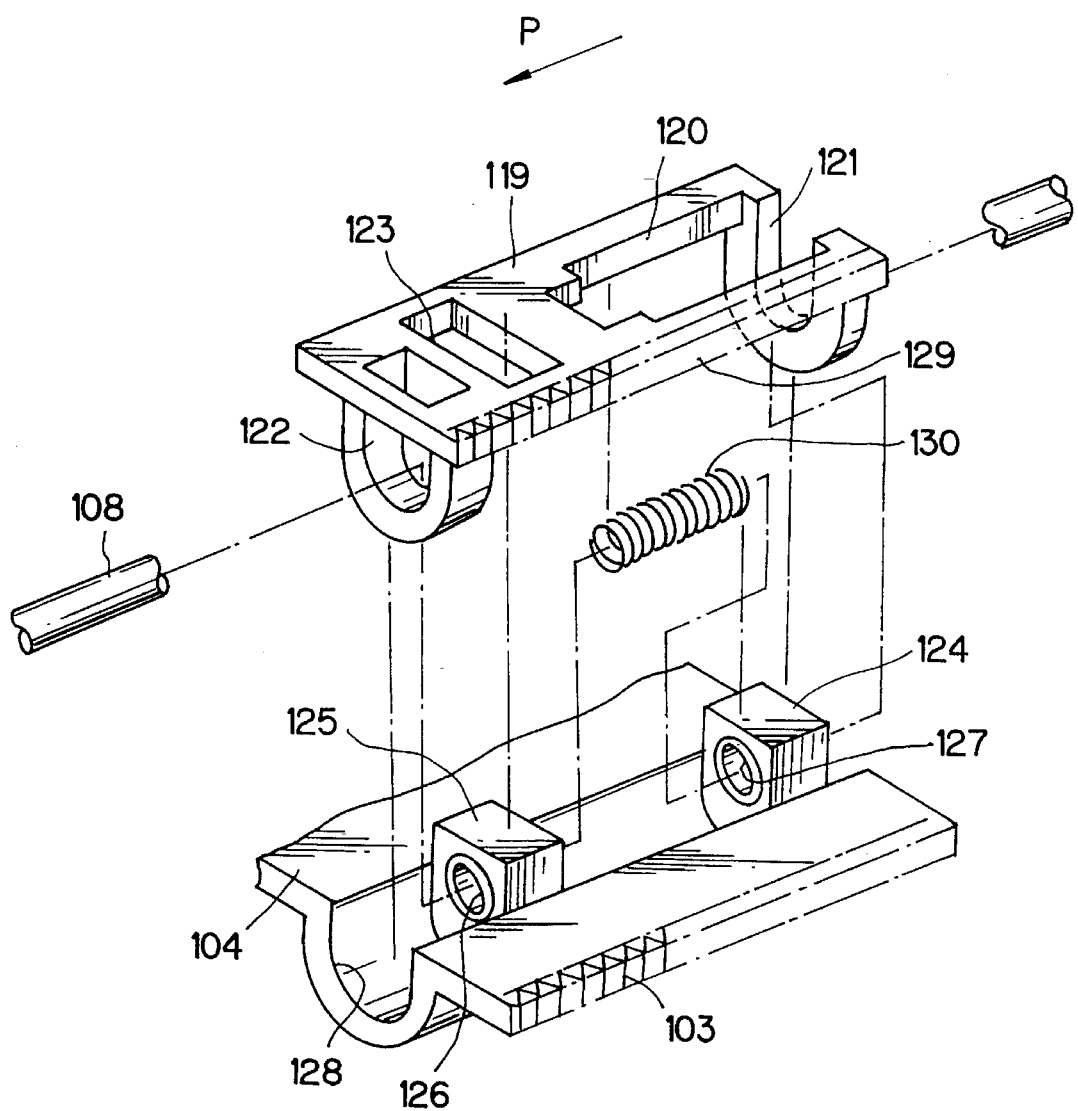
FIG. 16 is an exploded perspective view showing an arrangement for supporting the optical pickup device in the disc drive.

On the lateral side of the supporting block 104 is mounted a rack member 119 constituting a so-called double rack, as shown in FIG. 16. The rack member 119 is formed substantially as a flat plate carrying a rack gear portion 129 on its lateral edge. A pair of semicircular shaft-inserting portions 122, 121 are protuberantly formed on the lower surface of a planar portion of the rack member 119. The rack member 119 is supported by the shaft 108 by passing the shaft 108 through through-holes formed by the shaft-inserting portions 122,121 and the planar portion. The rack member 119 has through-holes in the planar portion.

The lateral surface of the supporting block 104 has a recess 128 for accommodating the shaft-receiving portions 122, 121 of the rack member 119. Within the recess 128 are formed protrusions 125, 124 fitted into through-holes 125, 124 in the rack member 119. These protrusions 125, 124 are formed with bearing holes 126, 127 which are passed through by the shaft 108 and in which is fitted the thrust bearing 135. When the rack member 119 is mounted on one end of the supporting block 104 and the shaft 108 is passed through the through-holes in the shaft-inserting portions 122, 121 provided on the rack member 119 and through the bearing holes 126, 127 of the supporting block 104, the rack gear 103 and the rack gear 119 are stacked in parallel to each other, as shown in FIG. 13. A compression spring 130 is interposed between the protrusion 124 of the supporting block 104 and the inner edge of the through-ole 120 of the rack member 119. The compression spring 130 is arranged coaxially with the shaft 108, that is, passed through the shaft 108. The compression spring 130 thrusts and biases the rack member 119 towards the supporting block 104, as shown by an arrow P in FIG. 16.

The pinion gear 102, constituting the second driving mechanism is engaged with both the rack gear 103 of the supporting block 104 and the rack gear 129 of the rack member 119. Since the rack member 119 is biased relative to supporting block 104 in one direction as indicated by arrow P in FIG. 16, there is no risk of backlash being produced between the pinion gear 102 and the rack gears 103, 129.

Figure 7:
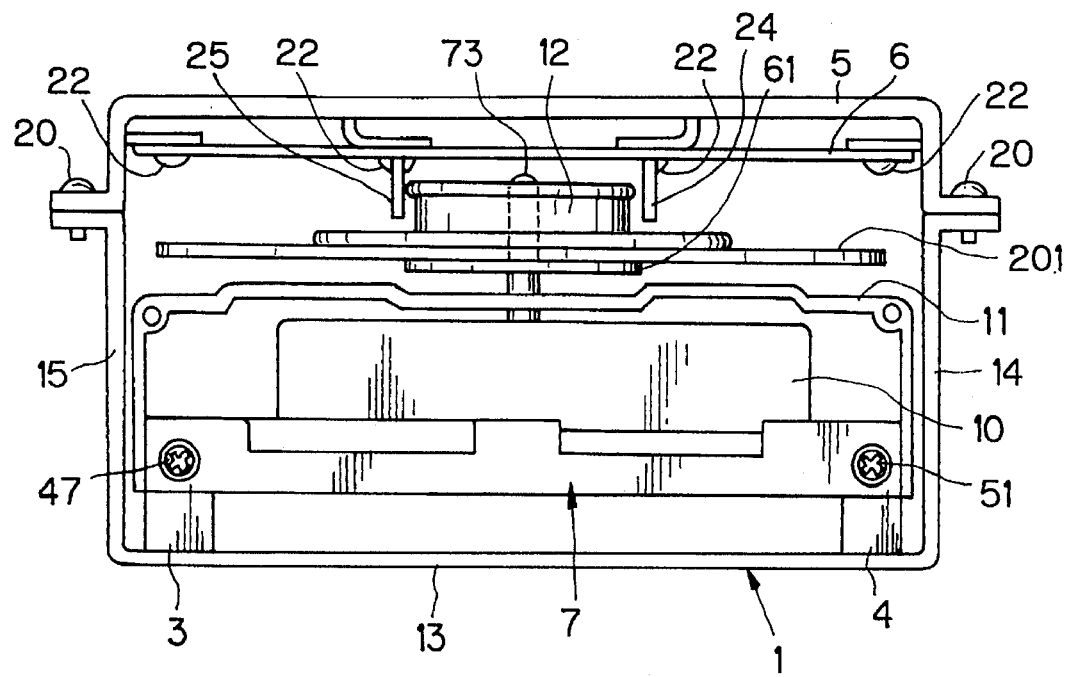
FIG. 7 is a front view of the disc player apparatus showing the state in which the optical disc and a disc stabilizer have been mounted.
Figure 10:
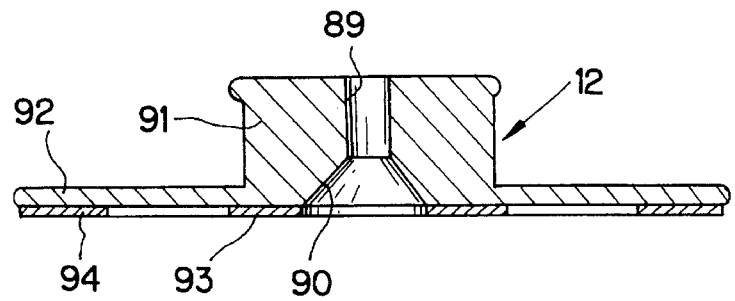
FIG. 10 is a longitudinal cross-sectional view showing the disc stabilizer.

On the disc table 61 is set the mid portion of the optical disc 201 on which a disc stabilizer 12 is set, so that the disc table clamps the optical disc 201 in cooperation with the disc stabilizer 12, as shown in FIG. 7. The disc stabilizer 12 is comprised of a columnar portion 91 and a disc-shaped portion 92 mounted on the lower end of the columnar portion 91, as shown in FIG. 10. The disc stabilizer is formed of a material, such as metal, having high specific gravity. The columnar portion 91 is formed with a fitting hole 89 into which is inserted the upper end of the spindle shaft 73. The lower end of the fitting hole 89 is formed as a tapered portion with an increased diameter 90 for evading abutment by the centering member 74. A pair of toroidal-shaped frictional sheets 93, 94, configured for generating the force of friction with the optical disc 201, are bonded to the lower surface of the disc-shaped portion 92. When the spindle motor is run in rotation, with the disc table 61 clamping the optical disc 201 in cooperation with the disc stabilizer 12, the disc table 61 is run in rotation in unison with the optical disc 201.

Figure 11:
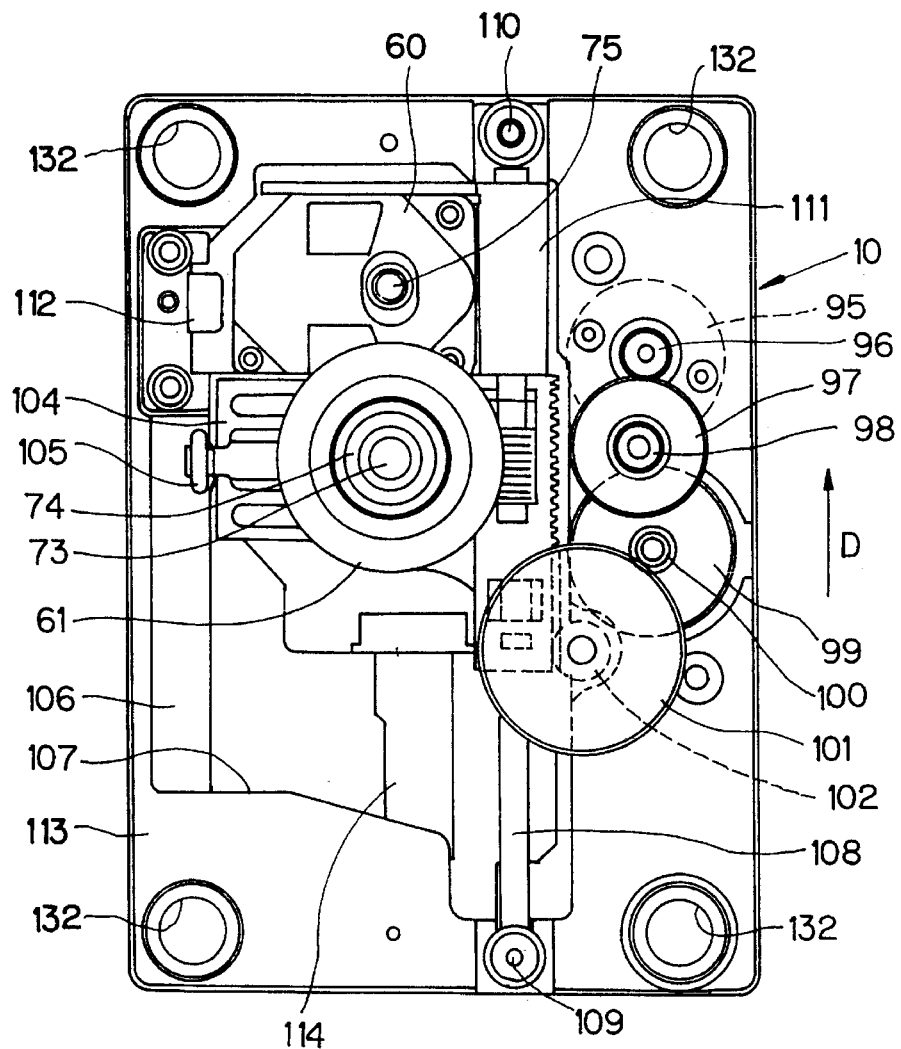
FIG. 11 is a plan view showing a disc drive.
Figure 12:
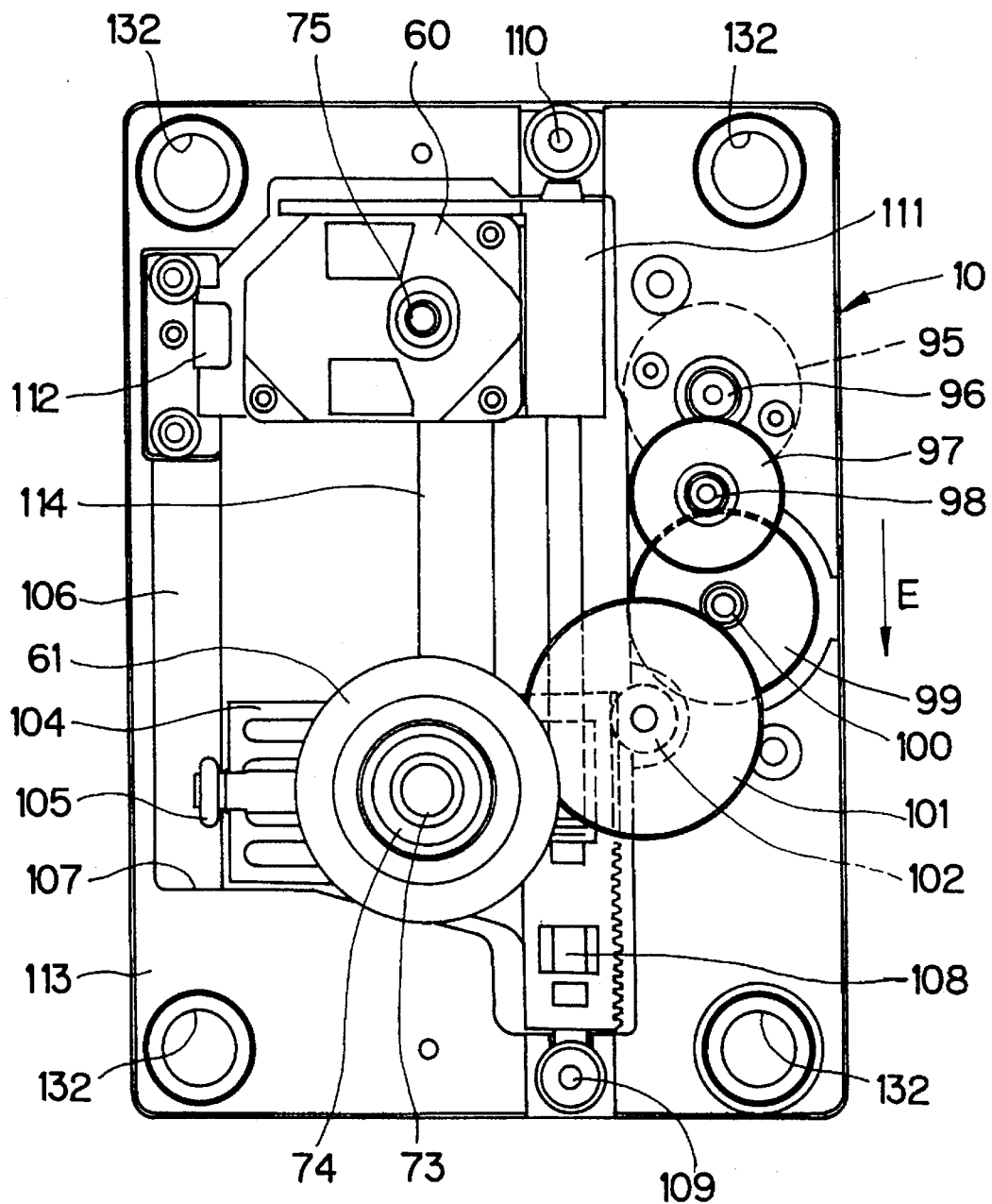
FIG. 12 is a plan view showing the state in which the disc table has been separated from an optical pickup device.

When the disc table 61 is moved to a position closest to the optical pickup device 60, the disc table 61 causes the inner most peripheral portion of the optical disc 201 clamped thereby to face the optical disc 75 of the optical pickup device 60, as shown in FIG. 11. When moved to a position furthest from the optical pickup device 60, as shown in FIG. 12, the disc table 61 causes the outer most peripheral portion of the optical disc 201 held thereby to-face the objective lens 75 of the optical pickup device 60.

The frame 113 is provided with a first movement position detection switch for detecting the most proximate position of the disc table 61 to the optical pickup device 60 and a second movement position detection switch for detecting the furthest position of the disc table 61 from the optical pickup device 60. When the disc table 61 is at the most proximate position to the optical pickup device, the first movement position detection switch is pressed and actuated by the supporting block 104. This first movement position detection switch is connected to a control circuit. When the supporting block 104 is moved by the second driving mechanism in a direction of approaching the optical pickup device 60, and the first movement position detection switch is pressed by the supporting block 104, the control circuit halts the thread motor 95. When the disc table 61 is at the position furthest from the optical pickup device, the second movement position detection switch is pressed by the supporting block 104. The second movement position detection switch is connected to the control circuit. When the supporting block 104 is moved by the second driving mechanism in a direction away from the optical pickup device 60, and the second movement position detection switch is pressed by the supporting block 104, the control circuit halts the thread motor 95.

The optical pickup device 60 and the disc table 61 are exposed to above the tray cover 11 via a through-hole 67 formed in the upper surface of the tray cover 11.

Figure 8:
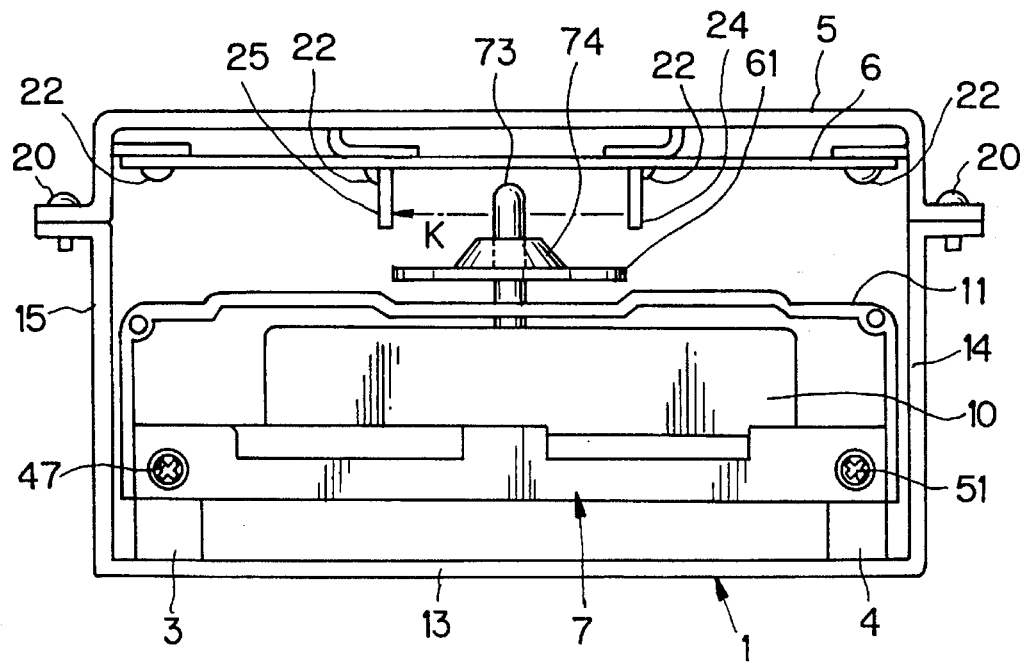
FIG. 8 is a front view of the disc player apparatus showing the state in which the optical disc and a disc stabilizer have not been mounted.

Within the outer casing, there is mounted detection means for detecting the possible presence of the centering member 12 on the disc table 61 when the tray unit 7 is moved towards a position in which the tray unit 7 is housed within the outer casing. The detection means are comprised of a light emitting element 24 mounted on the lower surface of the circuit substrate 6 and a light receiving element 25 mounted on the lower surface of the circuit substrate 6 for receiving the light K emitted by the light emitting element 24, as shown in FIGS. 2, 7 and 8. When the tray unit 7 is at the loading position, the disc table 61 is at the most proximate position relative to the optical pickup device 60 and the disc stabilizer 12 is set on the disc table 61, the light K proceeding to the light receiving element 25 from the light emitting element 24 is interrupted by the disc stabilizer 12, If the disc stabilizer 12 is not set on the disc table 61, the light K emitted by the light emitting element 24 reaches the light receiving element 25, without being interrupted by the spindle shaft 73, even if the tray unit 7 is at the loading position and the disc table 61 is at the most proximate position to the optical pickup device. That, is, the possible presence of the disc stabilizer 12 on the disc table 61 may be discerned by detecting whether or not the light receiving element 25 is receiving the light K from the light emitting device 25 in a timed relation to the tray unit 7 reaching the loading position and to the disc table 61 reaching the most proximate position with respect to the optical pickup device 60, as shown in FIG. 2.

With the above-described disc player apparatus according to the present invention, the above-described control controls the driving of the first and second driving mechanisms, rotation of the disc table 61 and display of the disc table 61.

The above-described control circuit operates so that, when the tray unit 7 is moved by the first driving mechanism in a direction indicated by arrow A in FIG. 3 to an ejecting position protruded out of the outer casing, the disc table 61 is moved by the second driving mechanism to a position furthest from the outer casing within a range of possible movement with respect to the tray unit 7, that is to a position furthest from the optical pickup device 60.

Consequently, with the present disc player apparatus, the disc table 61 may be moved sufficiently towards the front side so that the entire surface of the optical disc 201 is positioned ahead of the front panel 71, while the amount of protrusion of the tray unit 7 from the front panel 71 indicated by arrow N in FIG. 3 may be suppressed to a minimum value.

The control circuit also operates so that, when the tray unit 7 is moved by the first driving mechanism in a direction indicated by arrow C in FIG. 2, that is in the loading direction of accommodating the tray unit 7 within the outer casing, the disc table 61 is moved in a direction indicated by arrow D in FIG. 2 by the second driving mechanism, so that the disc table 61 is moved to the position most proximate to the optical pickup device 60 within the range of possible movement with respect to the tray unit 7.

Consequently, with the present disc layer apparatus, the playback operation or the optical disc 201 may be started immediately after the optical disc 201 is set on the disc table 61 and the tray unit 7 is moved to the loading position. The table-of-contents information specifying the contents of the information recorded on the optical disc 201 are recorded in the inner most position of the optical disc 201, such that the information signals may be started after readout of the table-of-contents information.

When the tray unit 7 is at the loading position, the control circuit inhibits rotation of the disc table 61 if the above-described detection mechanism fails to detect the presence of the disc stabilizer 12 on the disc table 61. The control circuit also displays on the display panel 70 that the disc stabilizer 12 has not been loaded on the disc table 61. Thus, with the present disc player apparatus, there is no risk of the disc table 61 being rotated without the disc stabilizer 12 being loaded on the optical disc 21 set on the disc table 61, so that there is no risk of possible accidents of the optical disc 201 descending from the disc table 61, while wasteful power consumption may also be prohibited. In addition, since the display panel 70 displays the effect that the disc stabilizer 12 has not been loaded on the disc table 61, the user of the disc player apparatus may be apprised of the reason the disc table 61 is not run in rotation.

When the optical disc 201 is set on the disc table 61, the disc stabilizer 12 is loaded on the optical disc 201, the tray unit 7 is at the loading position and the disc table 61 is at the most proximate position with respect to the optical pickup device 60, the reproducing operation from the optical disc 201 is enabled. That is, information signals are sequentially read along the recording tracks formed on the optical disc 201 beginning from the inner most region of the optical disc 201.

With progress in the readout of the information signals by the optical pickup device 60, the disc table 61 is moved in a direction of being spaced from the optical pickup device 60 as indicated by arrow E in FIG. 2. On the other hand, the disc table 61 is moved, responsive to selection of the position of reading out information signals on the optical disc by the optical pickup device 60, that is to the so-called track jump operation, in a direction towards and away from the optical pickup device 60, as indicated by arrows E and D in FIG. 2.

Figure 17:
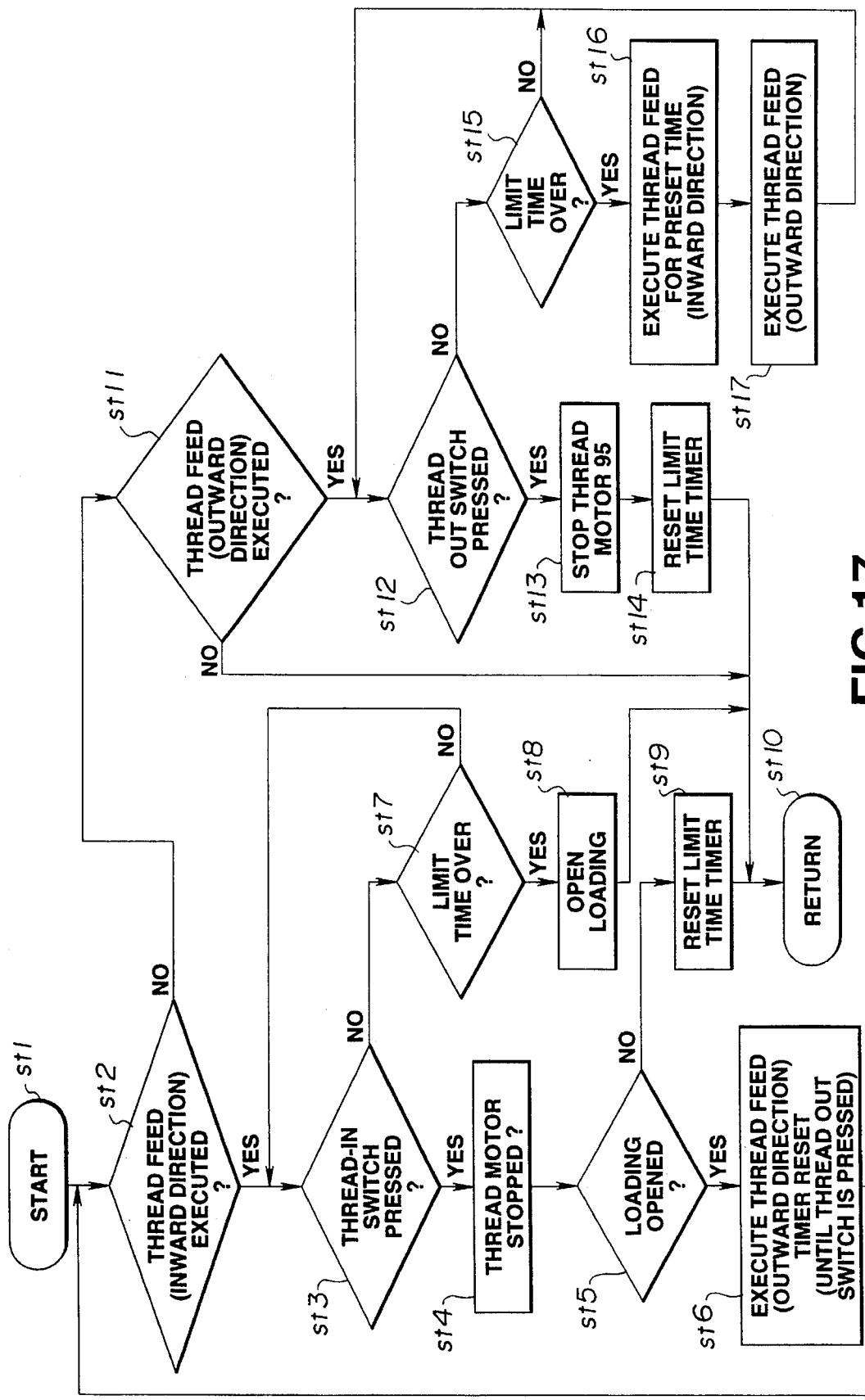
FIG. 17 is a flow chart for illustrating the operation of the disc player apparatus according to the present invention.

If, whilst the tray unit 7 is moved and the disc table 61 is also moved, the movement of the disc table 61 relative to the tray unit 7 is halted for longer than a pre-set time interval, the control circuit causes the direction of movement of the disc table 61 to be reversed. That is, referring to the flow chart of FIG. 17, the control circuit starts its control operation at step st1, and judges at step st2 whether or not the movement of the disc table 61 towards the optical pickup device 60 is being executed. If the state of the disc table 61 being moved towards the optical pickup device 60 is detected, the control circuit transfers to step st3 and, if otherwise, to step st11.

At step st3, the control circuit judges whether or not the first movement position detection switch has been pressed. If the first movement position detection switch has not been pressed, the control circuit transfers to step st4 and, if otherwise, to step st17.

At step st14, the thread motor 95 is halted. The control circuit then transfers to step st5.

At step st5, it is judged whether or not the tray unit is at any other position than the loading position in which the tray unit is drawn into the outer casing. If the tray unit 7 is at any other position than the loading position, the control circuit transfers to step st6. If the tray unit 7 is found at step st6 to be at the loading position, the control circuit transfers to step st9.

At step st6, the disc table 61 is moved, during the time until the second movement position detection switch is pressed, in a direction in which the disc table 61 is moved away from the optical pickup device 60 and the timer counting the limit time of the disc table movement is reset. The control circuit then reverts to step st2.

The timer is in the reset state during the initial stage of operation, that is when the thread motor 95 is stopped, and starts counting simultaneously with start of operation of the thread motor 95. The limit time counted by the timer is set so as to be equal to the time required for the disc table 61 to be moved from the position in which the disc table is closest to the optical pickup device 60 up to the position in which the disc table is furthest from the optical pickup device 60 plus one to two seconds.

At step st9, the timer is reset and program return is made at step st10.

If, as a result of the operation from step st1 up to step st6, the tray unit 7 is at a position other than the ejecting position in which it is drawn out of the outer casing, and the disc table 61 has been moved in a direction of approaching the optical pickup device 60, the disc table 61 is transiently moved to a position most proximate to the optical pickup device 60, and subsequently the disc table is moved to a position furthest from the optical pickup device 60.

It is judged at step st7 whether or not the limit time as counted by the timer has elapsed. If the limit time has elapsed, the control circuit transfers to step st8 and, if otherwise, reverts to step st3.

At step st8, the tray unit 7 is moved to the ejecting position and, at step st10, program return is made.

If, as a result of the operation from step st7 to step st8, the first movement position detection switch is not pressed even although the movement of the disc table 61 in a direction of approaching to the optical pickup device 60 is carried out for a time duration longer than the above limit time, the tray unit 7 is moved towards the ejecting position.

At step st11, it is judged whether or not the movement of the disc table 61 in a direction away from the optical pickup device 60 is being carried out. If the movement of the disc table 61 in a direction away from the optical pickup device 60 is being carried out, the control circuit transfers to step st10 for return.

At step st12, it is judged whether or not the second movement position detection switch has been pressed. If the second movement position detection switch has been pressed, the control circuit transfers to step st13 and, if otherwise, to step st15.

At step st13, the thread motor 95 is halted, before the control circuit transfers to step st14.

At step st14, the timer is reset, before the control circuit transfers to step st14.

At step st15, it is judged whether or not the limit time as counted by the timer has elapsed. If the limit time has elapsed, the control circuit transfers to step st16 and, if otherwise, the control circuit reverts to step st12.

At step st16, the movement of the disc table 61 in a direction towards the optical pickup device 60 is carried out for a pre-set time, before the control circuit transfers to step st17.

At step st17, the movement of the disc table 61 in a direction away from the optical pickup device 60 is carried out until the second movement position detection switch is pressed, before the control circuit transfers to step st12.

If, as a result of the operation from step st15 to step st17, the second movement position detection switch is not pressed, even if the disc table 61 is moved for a time duration longer than the above limit time, in a direction in which the disc table 61 is moved away from the optical pickup device 60, such as when the operator's finger is caught in a space between the disc table 61 and the edge of the through-hole 67 of the tray cover 11, the disc table 61 is inverted in its direction of movement, that is it is moved in a direction of approaching the optical pickup device 60 and is again moved in a direction away from the optical pickup device 60. This operation is repeated until the second movement position detection switch is pressed.

With the disc player apparatus of the present invention, the detection means for detecting the possible presence of the disc stabilizer 12 on the disc table 61 may be a contact type sensor employing a thrust switch in place of the above-described optical sensor.

What is claimed is:

1. A disc player apparatus comprising:

a tray unit supported for movement between a position of being housed within an outer casing and a position of being protruded outwardly from the outer casing;

a pickup device arranged on said tray unit for reading out the recorded information from a recording disc;

first driving means for moving said tray unit between the position of being housed within the outer casing and the position of being protruded outwardly from the outer casing;

a disc table supported on said tray unit for movement in a direction towards and away from said pickup device, said disc table holding and rotating said recording disc; and second driving means for moving said disc table on said tray unit in a direction towards and away from said pickup device, said second driving means moving said disc table to a position furthest from the outer casing in a range of predetermined movement of the disc table relative to the tray unit when said first driving means moves said tray unit to the position of being protruded from the outer casing.

2. The disc player apparatus as claimed in claim 1, wherein said tray unit is movable a distance substantially equal to the length of said tray unit by a shaft mounted therein being supported for movement by a thrust bearing arranged in the outer casing, said shaft having a length substantially twice that of the tray unit and being mounted in said tray unit by having its one end positioned in the vicinity of the forward end of the tray unit directed to outside the outer casing and by having its opposite end being protruded towards the rear of the tray unit and mounted on said tray unit, said thrust bearing supporting said shaft at a position in the vicinity of the forward end of the tray unit and at a position in the vicinity of the rear end of the tray unit when the tray unit is accommodated within said outer casing.

3. The disc player apparatus as claimed in claim 1, wherein said disc table has a spindle shaft and is arranged on a supporting block arranged on said tray unit for movement in a direction towards and away from said pickup device so that the disc table is rotatable on said spindle shaft, said supporting block being integrally formed from an electrically conductive material.

4. The disc player apparatus as claimed in claim 1, wherein said apparatus has control means for controlling said first and second driving means, said control means operating so that, when said tray unit is to be moved by said first driving means to the position of being protruded out of the outer casing, said disc table is moved by said second driving means to a position furthest from the pickup device in the range of predetermined movement of the disc table relative to said tray unit, said control means also operating for detecting, during movement of the disc table, the time of movement of the disc table relative to the tray unit, and for reversing the direction of movement of the disc table in case the time exceeding a pre-set time has elapsed.

5. The disc player apparatus as claimed in claim 1, further comprising a disc clamping member which can be detached when the tray unit is protruded out of the outer casing and which holds the recording disc in cooperation with said disc table.

6. A disc player apparatus comprising:

a tray unit supported for movement between a position of being housed within an outer casing and a position of being protruded outwardly from the outer casing;

a pickup device arranged on said tray unit for reading out the recorded information from a recording disc;

first driving means for moving said tray unit between the position of being housed within the outer casing and the position of being protruded outwardly from the outer casing;

a disc table supported on said tray unit for movement in a direction towards and away from said pickup device, said disc table holding and rotating said recording disc; and second driving means for moving said disc table on said tray unit in a direction towards and away from said pickup device, said second driving means moving said disc table to a position most proximate to the pickup device in a range of predetermined movement of the disc table relative to the tray unit when said first driving means moves said tray unit to the position of being housed within said outer casing.

7. The disc player apparatus as claimed in claim 6, wherein said tray unit is movable a distance substantially equal to the length of said tray unit by a shaft mounted therein being supported for movement by a thrust bearing arranged in the outer casing, said shaft having a length substantially twice that of the tray unit and being mounted in said tray unit by having its one end positioned in the vicinity of the forward end of the tray unit directed to outside the outer casing and by having its opposite end being protruded towards the rear of the tray unit and mounted on said tray unit, said thrust bearing supporting said shaft at a position in the vicinity of the forward end of the tray unit and at a position in the vicinity of the rear end of the tray unit when the tray unit is accommodated within said outer casing.

8. The disc player apparatus as claimed in claim 6, wherein said disc table has a spindle shaft and is arranged on a supporting block arranged on said tray unit for movement in a direction towards and away from said pickup device so that the disc table is rotatable on said spindle shaft, said supporting block being integrally formed from an electrically conductive material.

9. The disc player apparatus as claimed in claim 6, wherein said apparatus has control means for controlling said first and second driving means, said control means operating so that, when said tray unit is to be moved by said first driving means from the position of being protruded out of the outer casing to the position of being housed within said outer casing, said disc table is moved by said second driving means to the position most proximate to the pickup device in the range of predetermined movement of the disc table relative to said tray unit, said control means also operating for detecting, during movement of the disc table, the time of movement of the disc table relative to the tray unit, and for reversing the direction of movement of the disc table in case the time exceeding a pre-set time has elapsed.

10. A disc player apparatus comprising:
- a tray unit supported for movement between a position of being housed within an outer casing and a position of being protruded outwardly from the outer casing;
- a pickup device arranged on said tray unit for reading out the recorded information from a recording disc;
- first driving means for moving said tray unit between the position of being housed within the outer casing and the position of being protruded outwardly from the outer casing;
- a disc table, supported on said tray unit for movement in a direction towards and away from said pickup device, said disc table holding and rotating said recording disc; and
- second driving means for moving said disc table on said tray unit in a direction towards and away from said pickup device, said second driving means moving said disc table to a position furthest from the outer casing in a range of predetermined movement of the disc table relative to the tray unit when said first driving means moves said tray unit to the position of being protruded from the outer casing, said second driving means also moving said disc table to a position most proximate to the pickup device in the range of predetermined movement of the disc table relative to the tray unit when said first driving means moves said tray unit to the position of being housed within said outer casing.

11. The disc player apparatus as claimed in claim 10, wherein said apparatus has control means for controlling said first and second driving means, said control means operating so that, when said tray unit is to be moved by said first driving means between the position of being protruded out of the outer casing and the position of being housed within the outer casing, said disc table is moved by said second driving means to a position furthest from the pickup device in the range of predetermined movement of the disc table relative to said tray unit, said control means also operating for detecting, during movement of the disc table, the time of movement of the disc table relative to the tray unit, and for reversing the direction of movement of the disc table in case the time exceeding a pre-set time has elapsed.

* * * * *